United States Patent [19]

Hafner

[11] Patent Number: 4,986,691

[45] Date of Patent: Jan. 22, 1991

[54] STRIP LOCKING JOINT & METHOD OF MAKING SAME

[76] Inventor: Otto P. Hafner, 1321 Paddock Way, Cherry Hill, N.J. 08034

[21] Appl. No.: 250,913

[22] Filed: Sep. 29, 1988

[51] Int. Cl.⁵ ................................................ F16B 5/07
[52] U.S. Cl. .................................... 403/375; 403/285; 29/521
[58] Field of Search ............... 403/274, 285, 375, 340, 403/339; 29/509, 21.1, 521, 522.1

[56] References Cited

U.S. PATENT DOCUMENTS

| | | | |
|---|---|---|---|
| 3,728,779 | 4/1973 | Behlen et al. | 29/521 X |
| 3,934,918 | 1/1976 | Kress et al. | 29/521 X |
| 4,031,594 | 6/1977 | Cepuritis | 403/375 X |

FOREIGN PATENT DOCUMENTS

| | | | |
|---|---|---|---|
| 106985 | 3/1939 | Australia | 29/21.1 |
| 83824 | 6/1957 | Denmark | 29/521 |

*Primary Examiner*—Peter M. Cuomo

[57] ABSTRACT

A method of releasably connecting together strips of material comprising arranging the strips with surfaces facing each other and forming upwardly deformed areas of the strips above their planes and downwardly deformed areas of the strips below their planes, the deformed areas having intervening tie portions arranged at angles to the planes of the sheets, the tie portions being partially cut out to form tongues and interlining shoulders and remaining connected to the strips between deformed areas whereby upon relative longitudinal movement of the sheets, the tongues are displaced to seal against the shoulders and the inclined tie portions are adjacent to each other.

A releasable fastening connecting together strips of material facing each other comprising upwardly deformed areas of the strips above their planes and downwardly deformed areas of the strips below their planes, the deformed areas having intervening tie portions arranged at angles to the planes of the sheets, the tie portions being partially cut out to form tongues and interlocking shoulders and remaining connected to the strips between deformed areas, whereby upon relative longitudinal movement of the sheets, the tongues are displaced to become adjacent to the shoulders and the inclined tie portions become adjacent to each other.

5 Claims, 6 Drawing Sheets

STRIP LOCKING JOINT & METHOD OF MAKING SAME

BACKGROUND OF THE INVENTION

This invention relates to a strip locking joint, particularly to a releasable locking joint for connecting together deformable metal strips and a method for forming the same.

FIELD OF THE INVENTION

In some continuous processing operations, such as production of sheet metal for example, it is necessary to periodically replenish feed stocks by connecting rolls of sheet strip to each other.

For example, in a metal working or rolling operation, a metal sheet is typically threaded through various guides. Frequent re-threading is avoided because it is difficult and time-consuming. Often "leader sheets" or connective joints have been provided to connect together the trailing end of a sheet already in the machine to a lead end of a new sheet being fed. This invention relates to a quick, effective and novel way of making such a connection.

DISCUSSION OF THE PRIOR ART

U.S. Pat. Nos. 3,127,079, 3,619,050 and 4,572,460 disclose devices attachable to strips, sheets or webs to facilitate threading of leading ends of feed sheets into and through a machine. U.S. Pat. No. 3,741,079 discloses a web splicing method for joining together sheet materials being continuously fed through a machine. U.S. Pat. No. 3,599,318 discloses a method of bonding sheets which results in formation of two alternate joints.

U.S. Pat. No. 3,728,779 discloses a method of joining strip material. Two strips are overlapped and simultaneously deformed. The resulting deformed portion includes two displaced sides, with one side having an extending tab and the other side having a notch. Longitudinal sliding of the strips with respect to each other causes a shoulder on the tab on one strip to lockingly engage the shoulder of a corresponding notch on the other strip. However, this joint has been found to tend to disengage if sharply bent or formed into a small diameter coil, or when travelling over sharp turns in a tortuous path.

OBJECTS OF THE INVENTION

It is an object of the invention to provide a strip locking joint and method for forming the same which quickly and easily joins together overlapping strips so that the trailing end of one strip is quickly, reliably and economically joined to the leading end of another strip.

It is another object of the invention to provide a strip locking joint and method for forming the same which produces a joint which is easily engaged and which can withstand severe bending over a range of angles as it passes through continuously operating machinery.

It is a further object of the invention to provide a strip locking joint and method of making the same which may be quickly and easily disengaged without special tools or equipment.

Other objects and advantages of the invention will become apparent to those skilled in the art from the drawings, the detailed description of the drawings and the appended claims.

SUMMARY OF THE INVENTION

The invention provides a method of releasably connecting together strips of deformable material, which includes arranging the strips with surfaces facing each other, and forming upwardly deformed areas of the strips above their planes and downwardly deformed areas of the strips below their planes. The deformed areas have intervening tie portions arranged at angles to the planes of the sheets, with tie portions being cut out to form tongues and interlocking shoulders. Upon relative longitudinal movement of the sheets, the tongues are displaced to seat against the shoulders and the inclined tie portions bear against each other.

The invention further provides a strip locking joint wherein deformable strips face each other. Each strip has an upwardly cut and deformed area above its plane and a downwardly cut and deformed area below its plane. The deformed areas include an intervening tie portion arranged at angles to the planes. The tie portions are cut out to form tongues and interlocking shoulders. Upon relative longitudinal movement of the sheets, the tongues are displaced to seat against the shoulders and the inclined tie portions bear against each other, all as will become further apparent hereinafter, and in the drawings.

DETAILED DESCRIPTION OF THE INVENTION

Although a particular form of apparatus and method has been selected for illustration in the drawings, and although specific terms will be used in the Specification for the sake of clarity in describing the apparatus and method steps, the scope of this invention is defined in the appended claims and is not intended to be limited either by the drawings selected or the terms used in the Specification or abstract. Further, the terms "upper" and "lower" are used only as a convenience in distinguishing the respective strips and are not intended to imply any specific relationship in the vertical sense since as will be apparent hereinafter, the locking joints of this invention may be utilized upside down, either side up, or in any of a wide variety of angular configurations.

As shown from differing angles and perspectives in FIGS. 1 to 4, upper strip 10 faces and lies over lower strip 12. First deformed area 14 extends out of the plane of upper strip 10. Second deformed area 16 extends out of the plane of lower strip 12 and is shaped similar to upper upwardly deformed area 14. Second deformed area 16 lies beneath upper first deformed area 14, but is above the plane of upper sheet 10.

Similarly, third deformed area 18 lies below both of the planes of upper strip 10 and lower strip 12. Fourth deformed area 200 lies below the planes of lower strip 12 and resides underneath third deformed area 18. Fourth deformed area 20 is shaped similar to third deformed area 18.

End portion 22 connects first deformed area 14 to upper strip 10 on one end and intervening portion 24 connects first deformed area 14 to upper strip 10 on the other end. In a like manner, end portion 26 connects third deformed area 18 to upper strip 10 on one end and intervening portion 24 connects third deformed area 18 to upper strip 10 on the other end. End portion 23 connects second deformed area 16 to lower strip 12 on one end and intervening portion 25 connects second deformed area 16 to lower strip 12 on the other end. In a like manner, end portion 27 connects fourth deformed area 20 to lower strip 12 on one end and intervening portion 25 connects fourth deformed area 20 to lower strip 12 on the other end.

First deformed area 14 (see FIGS. 1 and 3) has a pair of opposing side edges 28 and 30, with a portion of the edges being angled to form shoulders 32 and 34, respectively. Upper strip 10 has a pair of opposing inner edges 36 and 38 (see FIG. 5) corresponding to side edges 28 and 30 of first deformed area 14, with a portion of the edges being angled to form tongues 40 and 42, respectively. Second deformed area 16 (see FIGS. 2 and 4) has a pair of opposing side edges 44 and 46 (see FIG. 3), with a portion of the edges being angled to form shoulders 48 and 50. Lower strip 12 has a pair of opposing inner edges 52 and 54 corresponding to side edges 44 and 46 of second deformed area 16, with a portion of the edges being angled to form tongues 56 and 58, respectively.

Third deformed area 18 (see FIGS. 1 and 3) has a pair of opposing side edges 60 and 62 (see FIG. 4), with a portion of the edges being angled to form shoulders 64 and 66, respectively. Upper strip 10 has a pair of opposing inner edges 68 and 70, corresponding to side edges 60 and 62 of third deformed area 18, with a portion of the edges being angled to form tongues 72 and 74, respectively. Fourth deformed area 20 (see FIGS. 2 and 4) has a pair of opposing side edges 76 and 78, with a portion of the edges being angled to form shoulders 80 and 82, respectively. Lower strip 12 has a pair of opposing inner edges (one is shown as edge 84, with the other edge not shown) corresponding to side edges 76 and 78 of fourth deformed area 20, with a portion of the edges being angled to form tongues 88 and 90 (see FIG. 3).

Figure 1:
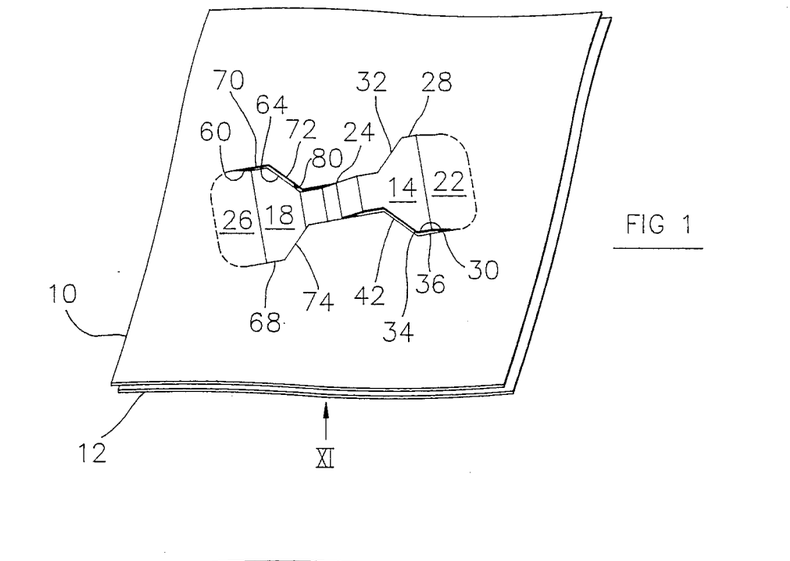
FIG. 1 is a perspective view of strips of deformable materials facing each other and having deformed areas and embodying important features of this invention.
Figure 2:
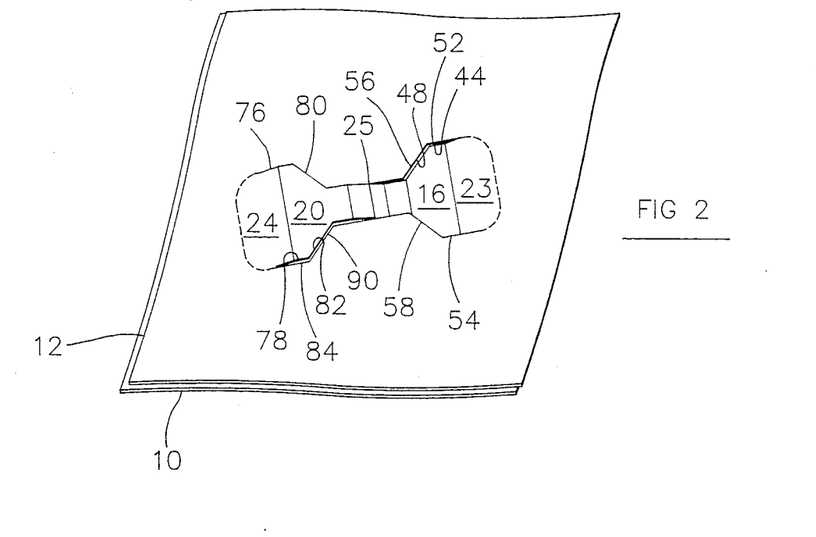
FIG. 2 is a perspective view of the reverse sides of the strips shown in FIG. 1.
Figure 3:
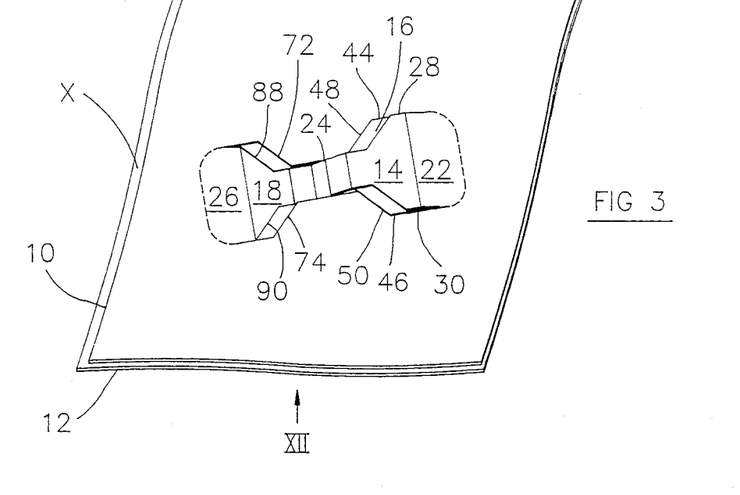
FIG. 3 is a perspective view of strips of deformable material connected together by a strip locking joint in accordance with the invention.

In FIG. 3, strip 12 is longitudinally displaced with respect to strip 10. A portion X of strip 12 indicates the degree of such longitudinal displacement. Tongues 40 and 42 of second deformed area 16 engage opposing inner edges 36 and 38 between first deformed area 14 and strip 10. Similarly, shoulders 88 and 90 engage opposing side edges 60 and 62 of third deformed area 18.

Figure 4:
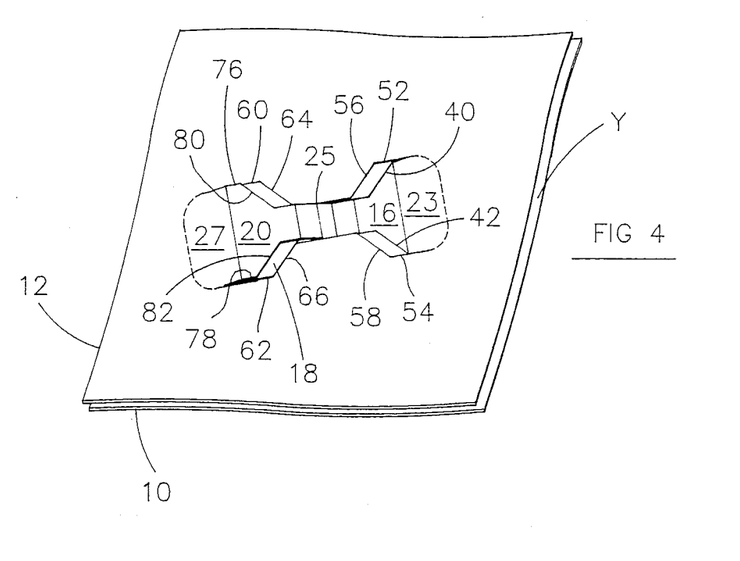
FIG. 4 is a perspective view of the reverse sides of the strips shown in FIG. 3.
Figure 5:
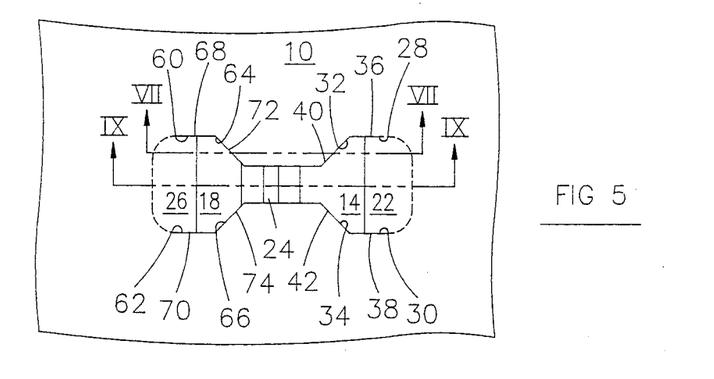
FIG. 5 is a top plan view of the strips shown in FIG. 1.
Figure 6:
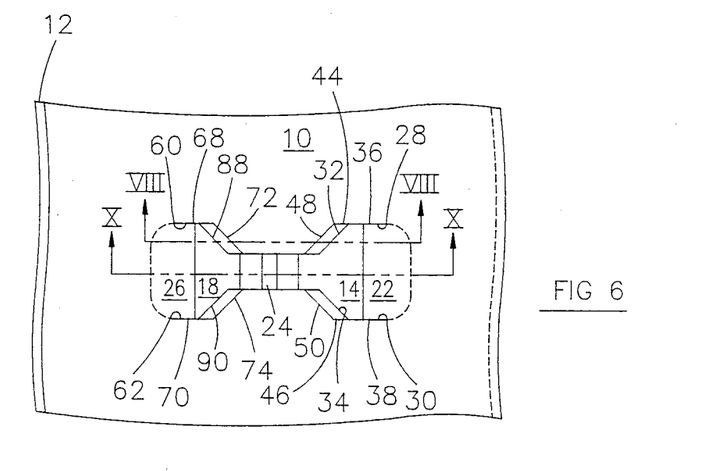
FIG. 6 is a top plan view of the strips locked together as shown in FIG. 3.

In FIG. 4, strip 12 is longitudinally displaced with respect to strip 10. A portion Y of strip 10 indicates the degree of such longitudinal displacement. Tongues 64 and 66 of third deformed area 18 engage opposing inner edges 68 and 70 between fourth deformed area 20 and strip 12. Similarly, shoulders 40 and 42 engage opposing side edges 76 and 78 of fourth deformed area 20.

Figure 7:
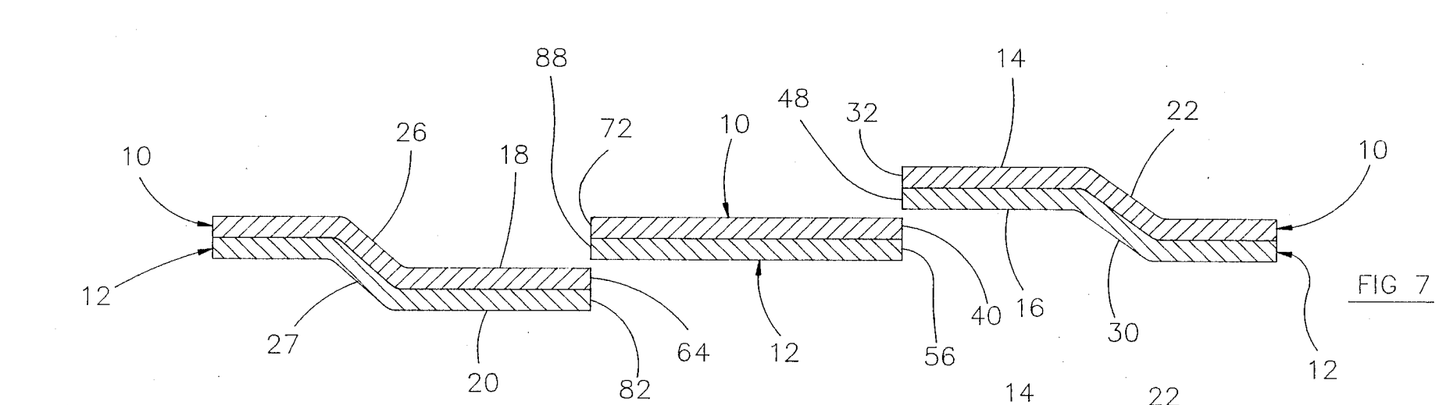
FIG. 7 is a view in cross-section of the strips of FIG. 5, taken as indicated by the lines and arrows VII—VII which appear in FIG. 5.
Figure 8:
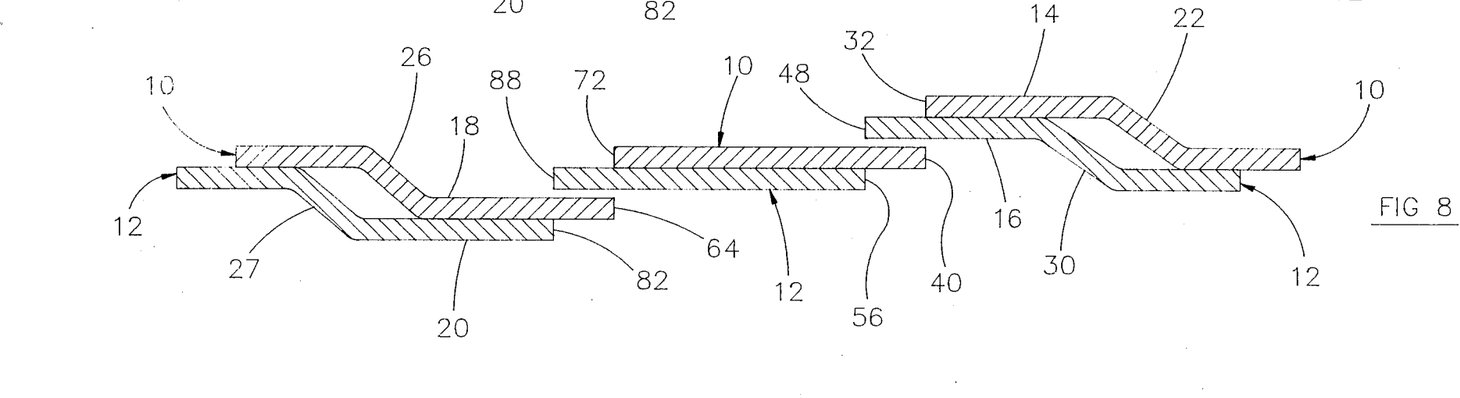
FIG. 8 is a view in cross-section of the strips locked together as in FIG. 6, and taken as indicated by the lines and arrows VIII—VIII which appear in FIG. 6.

Referring now to FIGS. 7 and 8, there is shown a comparison of cross sections of locked and non-locked strips 10 and 12. FIG. 7 shows strips 10 and 12 in the non-locked position with no overlapping of the respective shoulders and tongues. For example, shoulders 32 and 48 are essentially vertically aligned with corresponding tongues 40 and 56. Similarly, tongues 72 and 88 are essentially vertically aligned with corresponding shoulders 64 and 82. In FIG. 8, strips 10 and 12 have been longitudinally displaced so as to cause overlapping of the respective tongues and shoulders. For example, shoulder 48 has been longitudinally displaced with respect to shoulder 32 and now overlaps and engages tongue 40. Similarly, tongue 88 has been longitudinally displaced with respect to tongue 72 and overlaps and engages shoulder 64.

Figure 9:
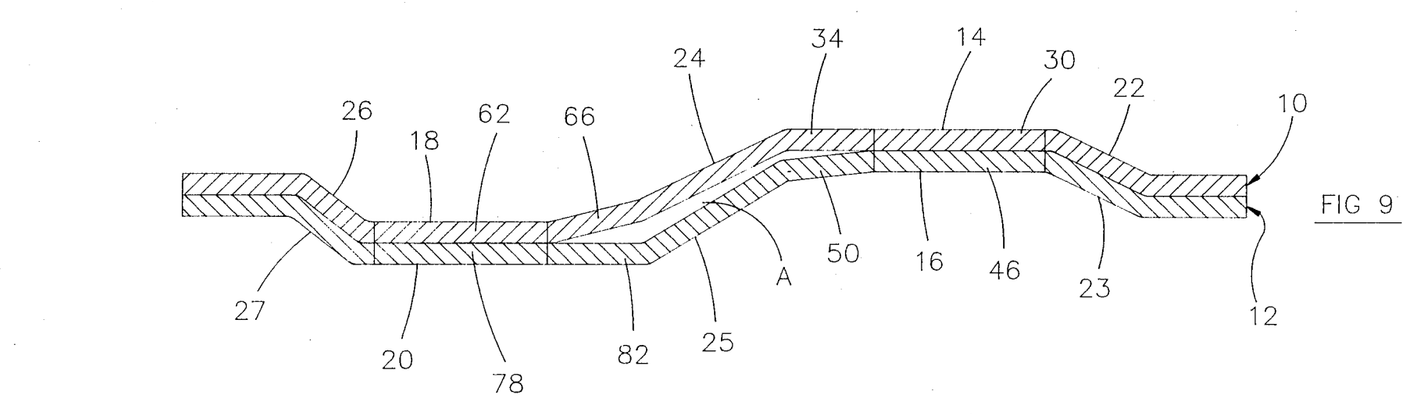
FIG. 9 is a view in cross-section of the strips of FIG. 5, taken as indicated by the lines and arrows IX—IX which appear in FIG. 5.
Figure 10:
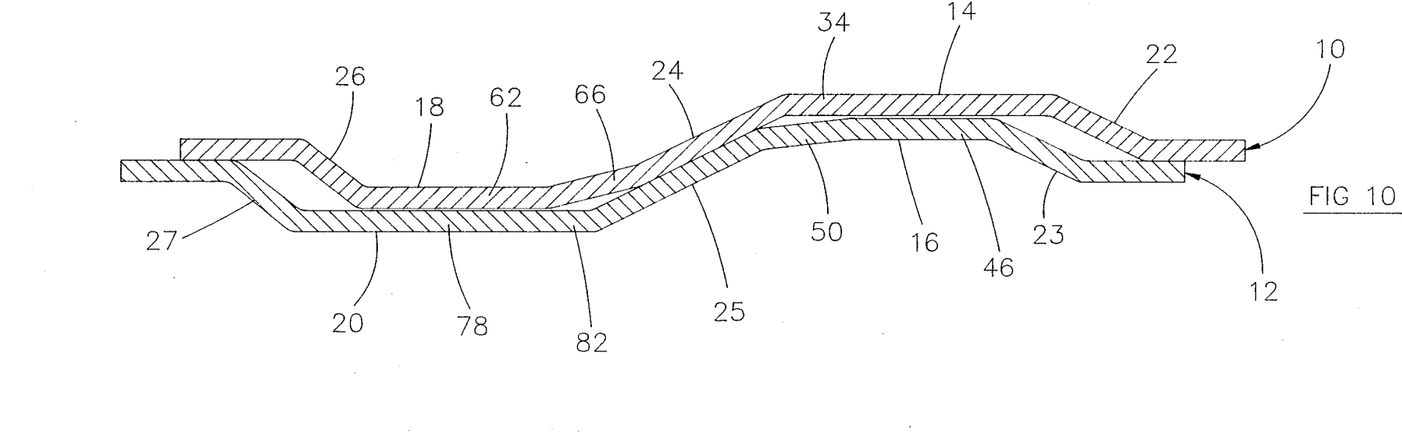
FIG. 10 is a view in cross-section of the strips of FIG. 6, locked together and taken as indicated by the lines and arrows X—X which appear in FIG. 6.

FIGS. 9 and 10 show further cross sections of strips 10 and 12 in unlocked and locked positions, respectively. These cross sections are taken at points along the strips where there are no shoulders, tongues, or edges. In FIG. 9, tie portions 24 and 25 are separated from one another with a space intervening as indicated by the letter "A". FIG. 10 shows that upon longitudinal displacement of strip 12 with respect to strip 10, such displacement causes tie portion 25 to either contact directly or come into close contact with tie portion 24, thereby substantially eliminating space "A" as illustrated in FIG. 9.

Figure 11:
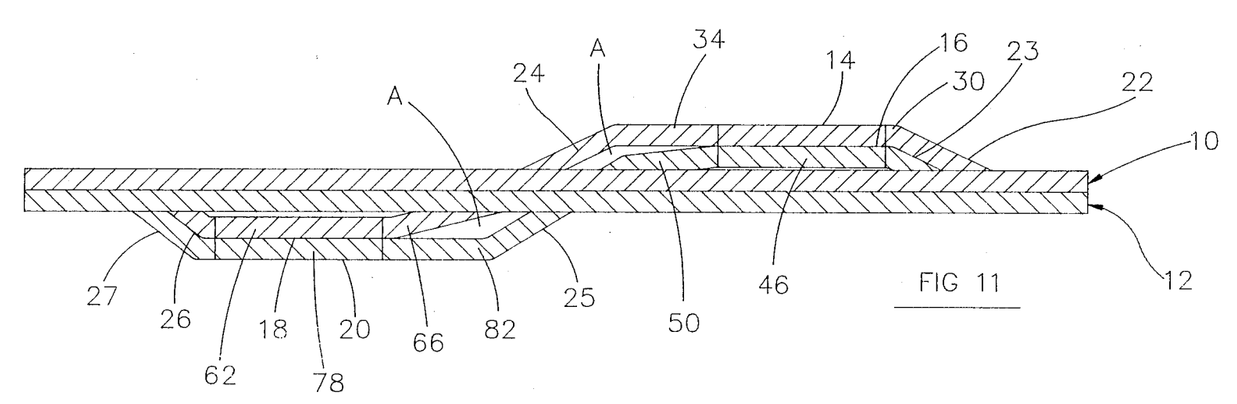
FIG. 11 is a side view of strips of deformable material taken in the direction indicated by the arrow XI from FIG. 1.
Figure 12:
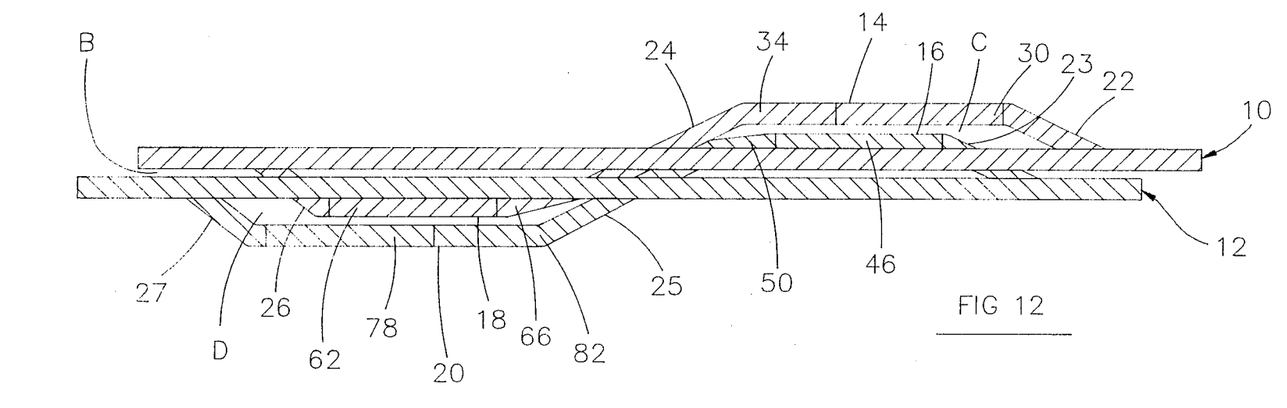
FIG. 12 shows a side view of strips of deformable material connected together by a strip locking joint taken in the direction indicated by the arrow XII from FIG. 3.

FIGS. 11 and 12 show side views of strips 11 and 12 in unlocked and locked positions, respectively. In FIG. 11, strips 10 and 12 are in substantially direct contact with each other as are first deformed portion 14 and second deformed portion 16. Similarly, third deformed portion 18 and fourth deformed portion 20 are in direct contact with each other. There is a space "A" between tie portions 24 and 25. In FIG. 12, strip 12 is longitudinally displaced with respect to strip 10, thereby locking the two strips together. There is a space "B" between strips 10 and 12. Similarly, there is a space "C" between second deformed portion 16 and first deformed portion 14. Space "D" has formed with the separation of third deformed portion 18 from fourth deformed portion 20.

In order to lock together two strips 10 and 12 of metal in accordance with the method of the invention, a portion of strips 10 and 12 are overlapped. Then by use of conventional metal punching and die apparatus, deformed portion 14, 16, 18 and 20 are formed. It is possible to first deform portions 14 and 16 upwardly and then second form deformed portions 18 and 21. It is also possible to deform all four deformed portions substantially simultaneously. It is, however, important that during deformation and cutting of deformed portions 14, 16, 18 and 20 that tie portions 24 and 25 are not severed completely from strips 10 and 12, respectively. Connection of tie portions 24 and 25 to strips 10 and 12 insures that their respective tongues and shoulders remain securely overlapped and locked.

Tie portions 24 and 25 also further assist in maintaining a secure lock by providing for a "ramping" effect. The ramping effect is shown in FIGS. 11 and 12. In FIG. 11, strips 10 and 12 directly face and contact each other prior to locking. In FIG. 12, strips 10 and 12 are separated by space "B." Space "B" is created through the so-called ramping effect caused by contact between tie portions 24 and 25. Tie portion 25 similarly longitudinally displaces as strip 12 is longitudinally displaced with respect to strip 10. However, because the lower portion of tie portion 24 extends below the plane of strip 12, it contacts tie portion 25 as tie portion 25 is displaced. Continued contact between tie portions 24 and 25 during longitudinal displacement of strip 12 with respect to strip 10 causes strips 10 and 12 to separate from one another by the "ramping" effect. Creation of space "B" by the ramping effect serves to more tightly cause deformed portion 16 to contact and engage strip 10 and similarly causes third deformed portion 18 to more forcibly contact lower strip 12. Such intimate contact provides a further locking effect. This is especially important when the overlapped portions of strips 10 and 12 and the locking joint traverse a manufacturing machine wherein the strip and joint travel over shaping coils, for example, in a tortious path.

Although this invention has been described in connection with specific forms thereof, it will be appreciated that a wide array of equivalent may be substituted for the specific elements shown and described herein without departing from the spirit and scope of this invention as described in the appended claims.

I claim:

1. In a method of releasably connecting together longitudinally extending deformable strips of material, the steps comprising:
    arranging the strips with surfaces facing each other, and
    forming upwardly deformed areas of said strips above their planes and downwardly deformed areas of said strips below their planes, said deformed areas having intervening tie portions arranged at angles to the planes of the sheets, said tie portions being cut out to form tongues and interlocking shoulders, said tie portions being connected to said strips between said deformed areas, whereby upon relative longitudinal movement of said sheets, said tongues are displaced to seat against said shoulders and the inclined tie portions are adjacent to each other.

2. A releasable joint connecting together longitudinally extending deformable strips of material facing each other comprising upwardly deformed areas of said strips above their planes and downwardly deformed areas of said strips below their planes, said deformed areas having intervening tie portions arranged at angles to the planes of the sheets, said tie portions being cut out to form tongues and interlocking shoulders, said tie portions being connected to said strips between said deformed areas, whereby upon relative longitudinal movement of said sheets, said tongues are displaced to become adjacent to said shoulders and the inclined tie portions became adjacent to each other.

3. In a method of releasably connecting together longitudinally extending deformable strips of material, the steps comprising:
    arranging the strips with surfaces facing each other;
    punching out a first portion of a first one of said strips, said first punched portion extending outwardly beyond a surface of said first strip and including deformed but not cut end portions and cut side portions, with a part of each of said side cuts angled at least partially laterally relative to said strips to form a pair of opposing locking lips in said first portion and a pair of corresponding shoulders in said first strip;
    punching out a second portion of said first strip in a direction extending outwardly beyond the other surface of said strip, in a direction opposite of said first punched portion, said second punched portion including deformed but not cut end portions and spaced-apart cut edges, one of said end portions being in common with one of said end portions of said first punched portion, with a part of each of said cut edges angled at least partially laterally relative to said strips to form a pair of opposing locking lips in said second portion and a pair of corresponding shoulders in said first strip;
    punching out a third portion of a second of said strips, said third punched portion extending outwardly beyond a surface of said second strip and including deformed but not cut end portions and cut side portions, with a part of each of said side cuts at least partially angled laterally relative to said strips to form a pair of opposing locking lips in said third portion and a pair of corresponding shoulders in said second strip;
    punching out a fourth portion of said second strip in a direction extending outwardly beyond the other surface of said strip in a direction opposite of said third punched portion, said fourth punched portion including deformed but not cut end portions and spaced-apart cut edges, one of said end portions being in common with one of said end portions of said third punched portion, with a part of each of said cut edges angled at least partially laterally relative to said strips to form a pair of opposing locking lips in said fourth portion and a pair of corresponding shoulders in said second strip;
    aligning said first portion with said third portion and aligning said second portion with said fourth portion; and
    longitudinally sliding one of said strips with respect to the other, thereby causing said shoulders of said second strip corresponding to said third portion to lockingly engage said lips of said first portion between said first portion and said first strip and causing said lips of said fourth portion to lockingly engage said shoulders of said first strip corresponding to said second portion between said first strip and said second portion.

4. The method defined in claim 3 wherein said first, second, third and fourth portions are punched in a single step.

5. A releasable joint locking together longitudinally extending deformable strips of material comprising:
    a punched out first portion of a first one of said strips, said punched out portion extending outwardly beyond a surface of said first strip and including deformed end portions and cut side portions, with a part of each of said side cuts at least partially laterally angled relative to said strips to form a pair of opposing lips in said first portion and a pair of corresponding shoulders in said first strip;

a punched out second portion of said first strip in a direction extending outwardly beyond the other surface of said strip in a direction opposite of said first punched portion, said second punched portion including deformed end portions and spaced-apart cut edges, one of said end portions being in common with one of said end portions of said first punched portion and being partially connected to said first strip, with a part of each of said cut edges angled at least partially laterally relative to said strips, to form a pair of opposing locking lips in said second portion and a pair of corresponding shoulders in said first strips;

a punched out third portion of a second one of said strips, said third punched portion extending outwardly beyond a surface of said second strip and including deformed end portions and two cut side portions, with a part of each of said side cuts at least partially angled laterally relative to said strips to form a pair of opposing locking lips in said third portion and a pair of corresponding shoulders in said second strip;

a punched out fourth portion of said second strip in a direction extending outwardly beyond the other surface of said strip in a direction opposite of said third punched portion, said fourth portion including deformed uncut end portions and spaced-apart cut edges, one of said end portions being in common with one of said end portions of said third punched portion and being partially connected to said first strip, with a part of each of said cut edges angled at least partially laterally relative to said strips to form a pair of opposing locking lips in said fourth portion and a pair of corresponding shoulders in said second strip;

said first and third punched portions and said second and fourth punched portions closely facing each other to permit longitudinal sliding of said strips with respect to each other such that said shoulders of said second strip corresponding to said third portion lockingly engage said lips of said first portion between said first portions and said first strip, and said lips of said fourth portion lockingly engages said shoulders of said first strip corresponding to said second portion between said first strip and second portion.

* * * * *